(12) United States Patent
Shah et al.

(10) Patent No.: US 10,970,335 B2
(45) Date of Patent: Apr. 6, 2021

(54) ACCESS PATTERN-BASED DISTRIBUTION FOR DISTRIBUTED KEY-VALUE STORES

(71) Applicant: VMware, Inc., Palo Alto, CA (US)

(72) Inventors: Mansi Shah, San Jose, CA (US);
Christian Dickmann, Kassel (DE);
Chaitanya Datye, Mountain View, CA (US); Niket Kandya, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 156 days.

(21) Appl. No.: 16/357,308

(22) Filed: Mar. 18, 2019

(65) Prior Publication Data

US 2020/0301970 A1 Sep. 24, 2020

(51) Int. Cl.
*G06F 16/00* (2019.01)
*G06F 16/901* (2019.01)
*G06F 16/22* (2019.01)
*G06F 16/9032* (2019.01)

(52) U.S. Cl.
CPC ...... *G06F 16/9017* (2019.01); *G06F 16/2228* (2019.01); *G06F 16/9032* (2019.01)

(58) Field of Classification Search
CPC ............. G06F 16/9017; G06F 16/9032; G06F 16/2228
See application file for complete search history.

(56) References Cited

U.S. PATENT DOCUMENTS

| | | | | |
|---|---|---|---|---|
| 9,262,323 | B1* | 2/2016 | Shankaran | G06F 16/184 |
| 2013/0332608 | A1* | 12/2013 | Shiga | G06F 9/5088 |
| | | | | 709/226 |
| 2014/0181035 | A1* | 6/2014 | Moue | G06F 16/25 |
| | | | | 707/647 |
| 2016/0078065 | A1* | 3/2016 | Moyne | G06F 16/27 |
| | | | | 707/694 |
| 2016/0196207 | A1* | 7/2016 | Gupta | G06F 12/0246 |
| | | | | 711/103 |
| 2017/0357682 | A1* | 12/2017 | Matsuda | G06F 16/2282 |

* cited by examiner

*Primary Examiner* — Hung Q Pham

(57) ABSTRACT

Techniques for implementing access pattern-based distribution of key-value content in a distributed key-value store comprising a plurality of nodes are provided. In one set of embodiments, a node in the plurality of nodes can receive a request to create a key-value entry. The node can further determine whether the key-value entry is associated with a first (e.g., global) scope or a second (e.g., local) scope. If the key-value entry is associated with the first scope, the node can cause the key-value entry to be replicated on every node in the plurality of nodes. On the other hand, if the key-value entry is associated with the second scope, the node cause the key-value entry to be stored solely on that node.

18 Claims, 3 Drawing Sheets

ACCESS PATTERN-BASED DISTRIBUTION FOR DISTRIBUTED KEY-VALUE STORES

BACKGROUND

A key-value store (KVS) is a type of database that stores information in the form of key-value entries (also known as key-value pairs). The key k in a key-value entry [k, v] is an identifier such as a number, string, etc. that uniquely identifies the entry and can be used to retrieve corresponding value v. The value v can be any type of data or metadata supported by the KVS. A typical KVS exposes PUT, DELETE, and GET operations to clients. PUT(k, v) creates a new key-value entry [k, v] or updates an existing entry if key k is already present, DELETE(k) deletes an existing key-value entry identified by key k, and GET(k) retrieves the value corresponding to key k.

KVSs can be distributed or non-distributed. A distributed KVS is configured to maintain key-value entries across a number of networked computer systems, referred to as nodes. Further, a distributed KVS allows clients to invoke key-value operations on any one of the nodes. In contrast, a non-distributed KVS is configured to store all if its key-value content, as well as consolidate all key-value processing, on a single computer system. Distributed KVSs are generally preferred over non-distributed KVSs for use cases and environments where scalability and fault-tolerance are important, such as enterprise environments, cloud infrastructures, and the like.

In existing distributed KVSs, all key-value content is either globally replicated across the nodes of the KVS such that each node maintains a copy of every key-value entry, or deterministically partitioned on a per-node or per-node group basis such that each node/node group maintains a subset (or "shard") of key-value entries in the KVS's key space. The global replication approach exhibits low latency for key lookups (i.e., GETs) because every lookup can be performed locally on the node that received the lookup request. However, due to the need to maintain a complete copy of the KVS's content at each node, the memory/storage cost for this approach is high. In contrast, the partitioned approach is more memory/storage efficient than global replication because each node only stores a subset, rather than the entirety, of the KVS's key-value content. However, with the partitioned approach every key lookup can potentially result in a network access to retrieve the requested key-value entry from a remote node, resulting in relatively high average latency per lookup.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

1. Overview

Embodiments of the present disclosure are directed to techniques for implementing access pattern-based distribution of key-value content in a distributed KVS. Stated another way, these techniques enable a distributed KVS to, for each key-value entry maintained by the KVS, selectively (1) replicate the entry globally across all of its nodes or (2) store the entry locally on a particular node or subset of nodes, where the selection of (1) or (2) is dependent on the manner in which the entry is typically accessed (or will likely be accessed) by clients. For example, key-value entries that are commonly accessed by clients via many different nodes may be globally replicated while key-value entries that are commonly accessed by clients via a single node may be stored locally on that one node.

With this hybrid approach (which effectively applies global replication or partitioning on a per-entry basis), the distributed KVS can advantageously consume less memory/storage space for storing its key-value content than KVSs that enforce full global replication, while at the same time achieve lower average lookup latency than KVSs that enforce full partitioning. In various embodiments, the mechanism by which key-value entries are determined as being appropriate for global replication or local storage, as well as the specific access pattern-related criteria used to make these determinations, can differ. These and other aspects are described in further detail below.

2. KVS Architecture

Figure 1:
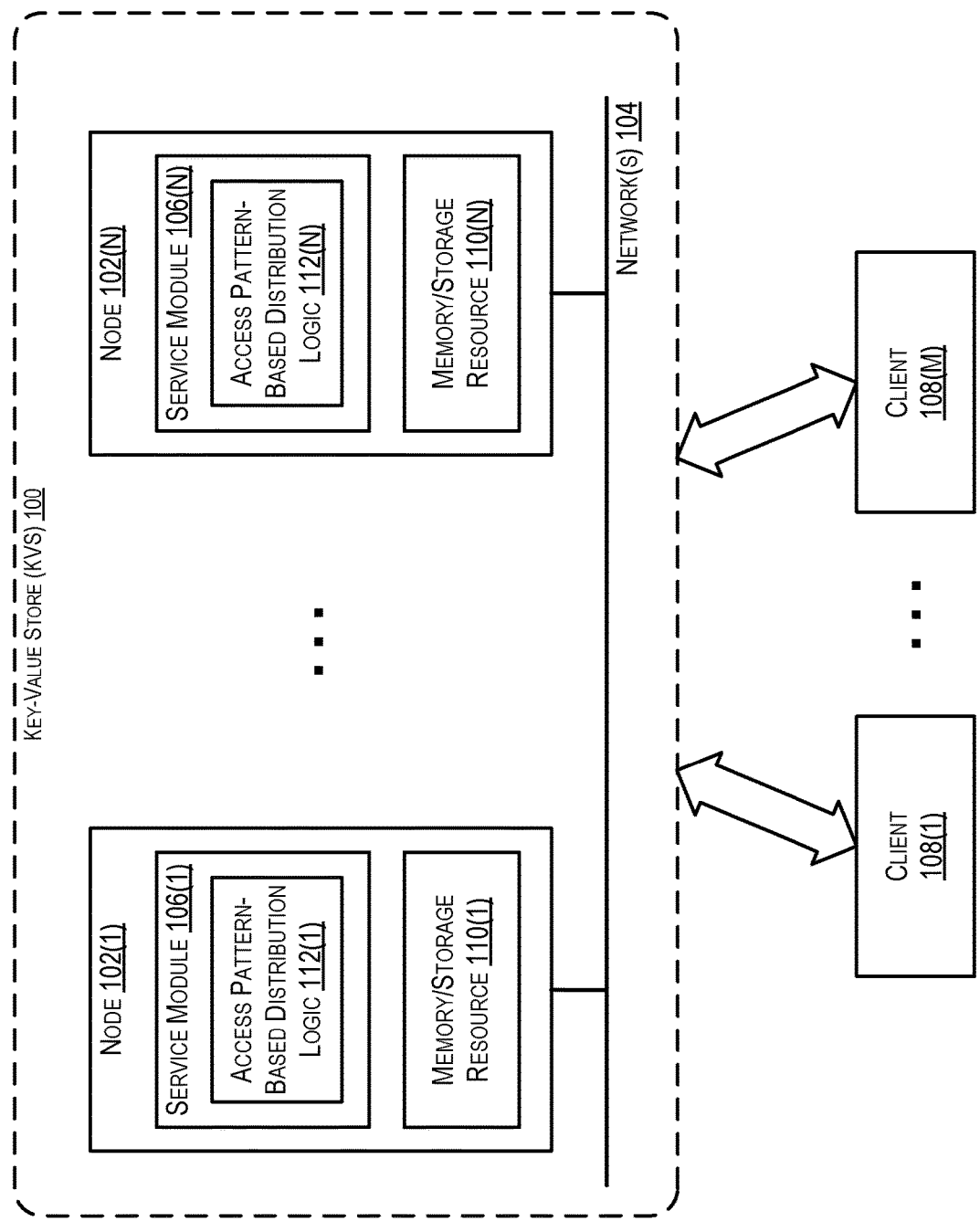
FIG. 1 depicts an architecture of a distributed KVS that implements access pattern-based distribution according to an embodiment.

FIG. 1 is a high-level block diagram of a distributed KVS 100 that implements the techniques of the present disclosure according to an embodiment. As shown, distributed KVS 100 comprises a set of nodes 102(1)-(N) that are communicatively coupled with each other via a network or set of networks 104. Nodes 102(1)-(N) can be implemented using physical computer systems, virtual computer systems (e.g., virtual machines), or a combination thereof.

Each node 102 includes a service module 106 that is configured to carry out the main processing and management tasks of KVS 100. For example, each service module 106 can expose, to one or more clients 108(1)-(M), operations for updating or looking up key-value entries in KVS 100 (e.g., PUT, DELETE, and GET operations as described previously). Upon receiving an invocation of a particular key-value operation from a client 108, service module 106 can execute the operation and return a response, if appropriate, to the client.

In addition, each node 102 includes a memory/storage resource 110 that is used to hold some portion (and potentially the entirety) of the key-value content maintained by KVS 100. In embodiments where KVS 100 is an in-memory key-value store, memory/storage resource 110 can comprise one or more volatile memory (e.g., DRAM) or non-volatile memory (e.g., NVM) devices. In other embodiments, memory/storage resource 110 can comprise one or more non-volatile storage devices (e.g., solid state disks, magnetic disks, etc.).

As noted in the Background section, existing distributed KVSs generally distribute their key-value content across nodes using one of two approaches: global replication and partitioning. In the case of global replication, every key-value entry is replicated and stored on every node of the KVS; this approach keeps the latency of key lookups low, but comes with a heavy memory/storage cost and thus limits the scalability of the system from a memory/storage perspective. In the case of partitioning, each node or group of nodes stores a partitioned shard of the KVS's key space (i.e., the range of keys supported by the KVS); this approach achieves better memory/storage efficiency than global replication, but undesirably increases the latency of key lookups due to the potential need to retrieve key-value data over the network.

To address the foregoing issues, each node 102 of FIG. 1 is enhanced to include a novel access pattern-based distribution logic component 112. In the example of FIG. 1, logic 112 is shown as being implemented as part of service module 106, although in alternative embodiments logic 112 may be implemented elsewhere in the software stack of node 102. At a high level, access pattern-based distribution logic 112 enables its corresponding service module/node to classify each key-value entry created at that node as having either "global" scope or "local" scope based on, among other things, the access pattern exhibited by (or likely to be exhibited by) the entry. As used herein, the "access pattern" of a key-value entry refers to where (i.e., at which node(s)) and/or how often the entry is looked up by clients. The node can then process the key-value entry in accordance with its scope designation, such that global scope entries are propagated/replicated to all nodes in the KVS while local scope entries are only stored locally on that node itself (i.e., the node where the entry was created, referred to as the "owner node" for the entry), as well as possibly a few other nodes associated with that owner node.

By classifying and processing key-value entries in this manner, distributed KVS 100 can achieve relatively efficient usage of memory/storage resources 110(1)-(N) (which is the main advantage of the global replication approach), and also keep the average latency of key lookups low (which is the main advantage of the partitioned approach). This is because entries that exhibit localized access patterns (i.e., are typically only accessed by clients via a single node or a small set of nodes) can be stored solely on those few nodes without affecting their lookup latencies, while entries that exhibit more globalized access patterns (i.e., are typically accessed by clients via many different nodes) can be replicated more broadly. Thus, access pattern-based distribution logic components 112(1)-(N) collectively enable a hybrid distribution approach across KVS 100 that combines the strengths of global replication and partitioning while minimizing their respective weaknesses.

The remaining sections of this disclosure describe workflows for creating and looking up key-value entries based on this hybrid approach, as well as other aspects and features (e.g., scope determination semantics, criteria for scope determination, etc.). It should be appreciated that the depiction of distributed KVS 100 in FIG. 1 is illustrative and not intended to limit embodiments of the present disclosure. For example, depending on the implementation, the organization of components within each node 102 and the mapping of functions to these components can differ. Further, in certain embodiments distributed KVS 100 may include additional components, sub-components, and/or functions that are not specifically described. One of ordinary skill in the art will recognize other variations, modifications, and alternatives.

3. Key-Value Entry Creation and Distribution

Figure 2:
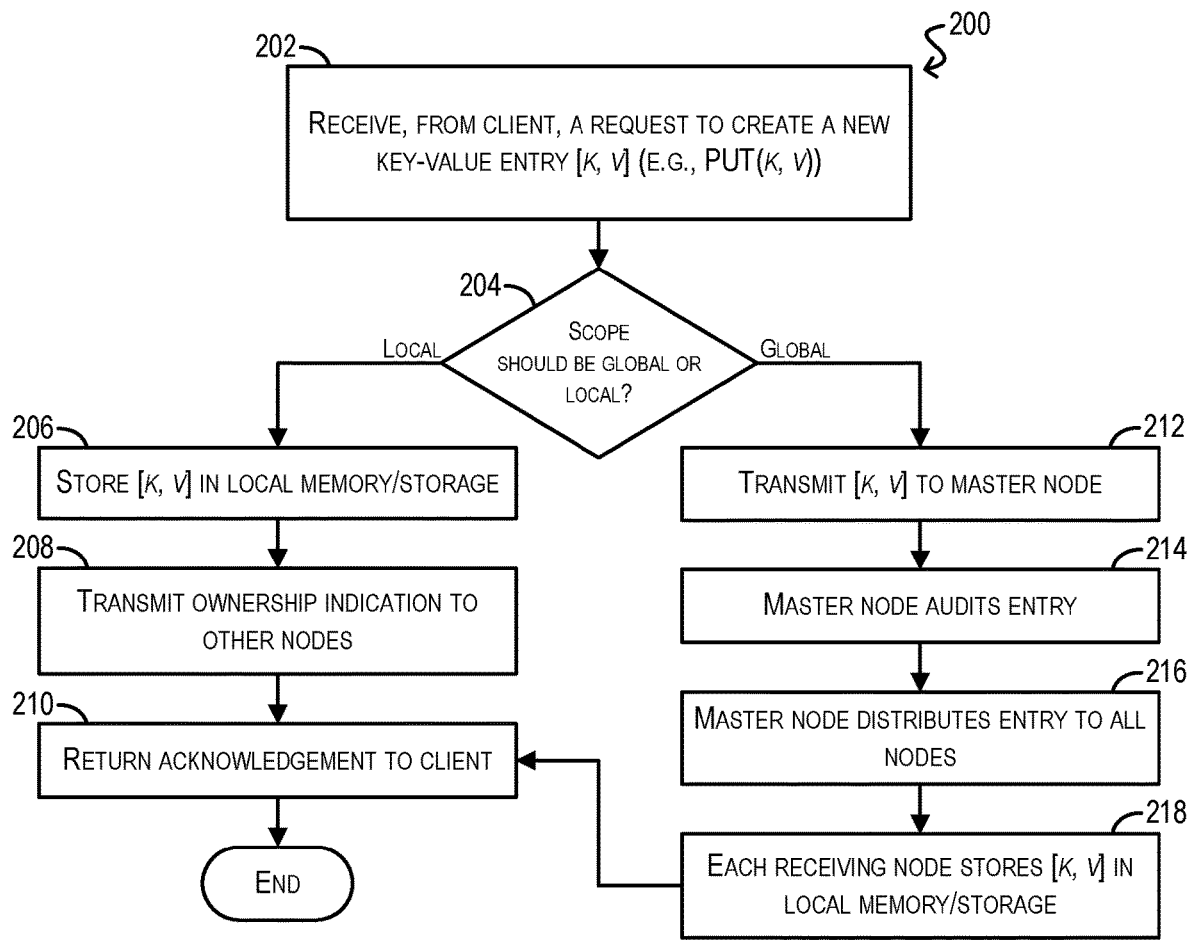
FIG. 2 depicts a workflow for creating and distributing a new key-value entry according to an embodiment.

FIG. 2 depicts a workflow 200 that can be executed by service module 106 of each node 102 of distributed KVS 100 (in accordance with access-based distribution logic 112) for creating and distributing a new key-value entry in the KVS based on its scope designation (i.e., global scope or local scope) according to an embodiment. Workflow 200 is agnostic of the particular way in which the scope for the key-value entry is determined; section (5) below describes various semantics that can be used for scope determination.

Starting with block 202, service module 106 can receive, from a client 108, a request to create a new key-value entry [k, v] in distributed KVS 100 (e.g., an invocation of PUT(k, v)). In response, service module 106 can determine whether the scope of the entry/key k should be global or local (block 204).

If the scope should be local, service module 106 can store the new key-value entry in its local memory/storage resource 110 (block 206). Service module 106 can further transmit an indication that the entry for key k is locally stored on (i.e., is owned by) node 102 to the other nodes in the system (block 208), return an acknowledgement to client 108 that the operation is completed/successful (block 210), and terminate the workflow.

On the other hand, if the scope of the entry/key k should be global, service module 106 can transmit the key-value entry to a "master" node in distributed KVS 100 (block 212). This master node can audit the entry to ensure that its global distribution will not cause any issues (e.g., result in duplicate entries) (block 214). In one set of embodiments, there can be a single master node in distributed KVS 100 that is responsible for auditing entries for all keys. In other embodiments, there can be multiple master nodes, each being responsible for auditing keys within a particular range or subset of the key space of the KVS.

Assuming the audit at block 214 is successful, the master node can distribute (i.e., publish) the key-value entry to all other nodes in distributed KVS 100, including the original node at which the create operation was received, for recordation thereon (block 216). In response, each receiving node can store the new key-value entry in its local memory/storage resource 110 (block 218). Finally, the original node can return an acknowledgement to client 108 that the operation is completed/successful (block 210) and terminate the workflow.

It should be appreciated that workflow 200 is illustrative and various modifications are possible. For example, while workflow 200 indicates that ownership information regarding a newly created local scope entry is communicated to other nodes at block 208, in some embodiments those other nodes may be able to infer the ownership of the entry based on global scope information maintained on every node. In this case, block 208 can be omitted. Further, although workflow 200 focuses on the creation and distribution of a new key-value entry, similar steps can be employed to distribute an existing key-value entry that is modified via an update operation.

4. Key-Value Entry Lookup

Figure 3:
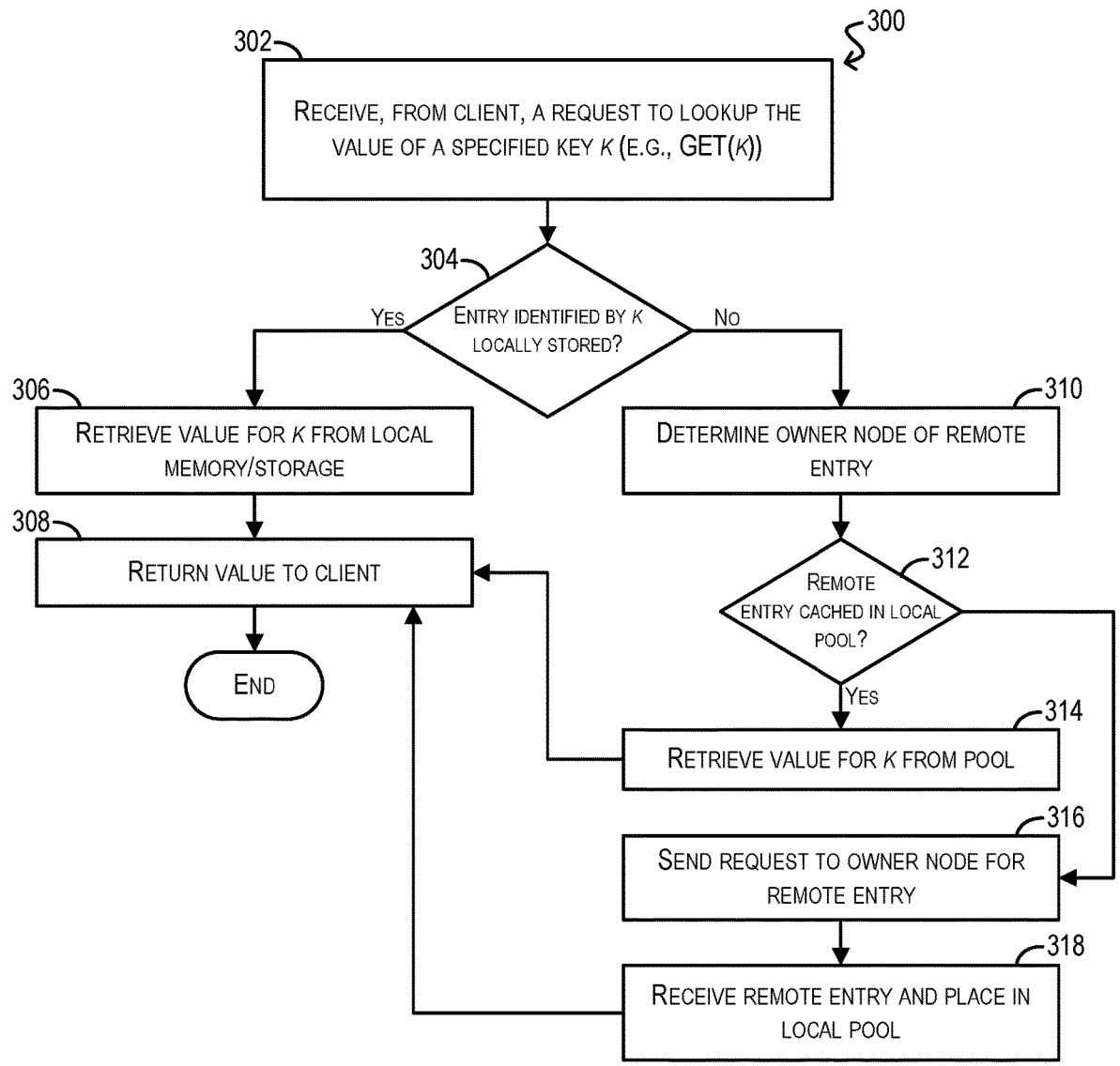
FIG. 3 depicts a workflow for looking up a key-value entry according to an embodiment.

FIG. 3 depicts a workflow 300 that can be executed by service module 106 of each node 102 of distributed KVS 100 (in accordance with access-based distribution logic 112) for looking up a key-value entry in the KVS according to an embodiment.

Starting with block 302, service module 106 can receive, from a client 108, a request to lookup the value of a specified key k (e.g., an invocation of GET(k)). In response, service module 106 can determine whether the key-value entry identified by key k is locally stored on its corresponding node 102 (block 304). In various embodiments, service module 106 can perform this determination by searching for key k in its local memory/storage resource 110.

If the entry identified by key k is locally stored (indicating that the entry either (1) has global scope or (2) has local scope and is owned by this node), service module 106 can simply retrieve the value associated with the key from its local memory/storage resource 110 (block 306), return the value to client 108 (block 308), and end the workflow.

On the other hand, if the entry identified by key k is not locally stored, service module 106 can conclude that the entry is a local scope entry that is owned by another node in distributed KVS 100 (referred to as a "remote entry"). In this case, service module 106 can determine the owner node of this remote entry (block 310). In one set of embodiments, this can comprise checking for an ownership indication previously sent by the owner node per block 208 of workflow 200.

In addition, service module 106 can check whether the remote entry is cached in a local remote entry pool, which comprises remote entries that have been queried from other nodes in response to lookup requests (block 312). If so, service module 106 can retrieve the value associated with key k from the pool (block 314), return the value to client 108 (block 308), and terminate the workflow.

Otherwise, service module 106 can send a request to the owner node of the remote entry for the remote entry (block 316). In response, service module 106 can receive the remote entry from its owner node and place it in the local remote entry pool (block 318). Finally, service module 108 can return the value in the received remote entry to client 108 (block 308) and workflow 300 can end.

5. Scope Determination

The particular manner in which key-value entries are determined/classified to have global scope or local scope can vary depending on the implementation. In one set of embodiments, this scope determination can be performed by users/clients of distributed KVS 100 on a per-entry basis. For example, at the time of creating a new key-value entry, the user/client that submits the create request can include, as part of the request, an indication of desired scope for the entry (e.g., global or local). This provides flexibility to the users of the KVS in designing the schema, but also requires the users to think through how their classifications will affect the overall memory/storage usage and latency of the system.

In another set of embodiments, the scope determination can be statically controlled/defined by one or more authorized users. For example, an administrator of the KVS can create or update a configuration file or data structure that maps certain types of key-value entries to local scope and maps other types of key-value entries to global scope. Then, when a given key-value entry is created, it will be assigned to the scope that its type is mapped to in the configuration file/data structure. This approach safeguards the system against, e.g., malicious users because the scope determination of every entry is predetermined, but also limits the flexibility of the schema design.

In yet another set of embodiments, the KVS itself can self-learn the access patterns of key-value entries that have been created in the system and thereby automatically determine the appropriate scope for each entry. With this approach, the classification process can be completely transparent to users. In addition, the scope of key-value entries can dynamically change over time as their access patterns change. In certain embodiments, this self-learning approach can be used in conjunction with either of the two other approaches above, such that initial scope classifications are made via one of those two approaches and then modified as needed/appropriate via the self-learning model.

6. Criteria for Scope Determination

There are a number of different criteria that may be taken into account by users and the self-learning model when determining the scope of key-value entries. Some of these criteria are described below. It should be noted that this list is exemplary and additional criteria may be added (or certain criteria may be removed) depending on the implementation. Further, these criteria may be combined in various ways (e.g., assigned weightings, etc.) in order to arrive at a final scope determination result for a given entry.

6.1 Access Locality and Frequency

In certain embodiments, entries that are heavily accessed across the nodes of the KVS can be considered good candidates for global scope, while entries that are heavily accessed on a particular node and accessed rarely on other nodes can be considered good candidates for being local scope. This optimizes memory/storage usage while also keeping average lookup latency relatively low.

6.2 Network Latency

If the KVS is experiencing a large amount of network latency between nodes, it can be beneficial to classify key-value entries as global scope irrespective of their access patterns, or at least skew classification towards global rather than local scope. This avoids scenarios where average lookup latency becomes extremely high due to adverse network conditions.

6.3 Memory/Storage Consumption

The amount of memory/storage space a key-value entry consumes can also be a consideration for its scope. For example, larger entries can be classified as global scope because the network bandwidth requirements for such entries can be very high, which makes it inefficient to remotely fetch the entry on potentially every lookup.

7. Remote Entry Pool Management

As indicated in workflow 300 of FIG. 3, each node 102 of distributed KVS 100 can maintain a local remote entry pool that caches remote entries fetched by the node from other nodes in response to lookup requests. As the size of this pool grows over time, there is a need for the node to manage the entries in the pool and purge entries that are no longer needed in order to make room for new entries.

One way to accomplish this is via a time-based expiry approach. With this approach, each remote entry can be associated with a timeout period that begins at the time the entry is added to the pool; once the timeout period expires, the entry can be purged. In one set of embodiments, this timeout period can be specified on a per-entry basis by the creator of the entry. In other embodiments, the timeout period can be specified via a configurable system-wide parameter that applies to all entries.

Another way to manage the remote entry pool is via a user-based expiry approach. With this approach, a user which caused a remote entry to be fetched from a remote node (i.e., requested a lookup which resulted in retrieval of the remote entry) can notify the system once he/she is done consuming the remote entry. The entry can then be purged from the pool in response to this notification. This approach can be more memory efficient than the time-based expiry approach since entries are only kept in the pool for as long as needed; however, it requires additional effort on the part of users to ensure that they notify the system in a timely fashion.

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A method for implementing access pattern-based distribution of key-value content in a distributed key-value store comprising a plurality of nodes, the method comprising:
   receiving, by a physical computer processor of a first node in the plurality of nodes, a first request to create a key-value entry wherein the first request to create a key-value entry includes an indication of whether the key-value entry is associated with a first scope or a second scope;
   determining, by the physical computer processor of the first node, whether the key-value entry is associated with the first scope or the second scope based on the indication included in the request of whether the key-value entry is associated with the first scope or the second scope;
   if the key-value entry is associated with the first scope based on the indication included in the request of whether the key-value entry is associated with the first scope or the second scope, causing, by the first node, the key-value entry to be replicated and stored in the physical memory or storage resource of every node in the plurality of nodes; and
   if the key-value entry is associated with the second scope based on the indication included in the request of whether the key-value entry is associated with the first scope or the second scope, causing, by the first node, the key-value entry to be stored solely in the physical memory or storage resource of the first node.

2. The method of claim 1 wherein the determining comprises:
   examining a configuration data structure that includes predefined mappings between key-value entry types and scopes.

3. The method of claim 1 wherein the determining comprises:
   receiving, from a self-learning model executed by the first node, an indication of whether the key-value entry is associated with the first scope or the second scope.

4. The method of claim 3 wherein the self-learning model is configured to take into account likely access locality and access frequency of the key-value entry across the plurality of nodes.

5. The method of claim 4 wherein the self-learning model is further configured to take in account current network latencies between the plurality of nodes or a size of the key-value entry.

6. The method of claim 1 further comprising:
   receiving, by the first node, a second request, subsequent to the first request, to lookup the key-value entry;
   if the key-value entry is stored on the first node:
      retrieving the key-value entry from a local memory or storage resource of the first node; and
   if the key-value entry is not stored on the first node:
      determining an owner node in the plurality of nodes where the key-value entry is stored; and
      transmitting a request to the owner node for the key-value entry.

7. A non-transitory computer readable storage medium having stored thereon program code executable by a first node in a distributed key-value store comprising a plurality of nodes, the program code embodying a method for implementing access pattern-based distribution of key-value content in the distributed key-value store, the method comprising:
   receiving a first request to create a key-value entry wherein the first request to create a key-value entry includes an indication of whether the key-value entry is associated with a first scope or a second scope;

determining whether the key-value entry is associated with the first scope or the second scope based on the indication included in the request of whether the key-value entry is associated with the first scope or the second scope;

if the key-value entry is associated with the first scope based on the indication included in the request of whether the key-value entry is associated with the first scope or the second scope, causing the key-value entry to be replicated on every node in the plurality of nodes; and if the key-value entry is associated with the second scope based on the indication included in the request of whether the key-value entry is associated with the first scope or the second scope, causing the key-value entry to be stored solely on the first node.

8. The non-transitory computer readable storage medium of claim 7 wherein the determining comprises:
examining a configuration data structure that includes predefined mappings between key-value entry types and scopes.

9. The non-transitory computer readable storage medium of claim 7 wherein the determining comprises:
receiving, from a self-learning model executed by the first node, an indication of whether the key-value entry is associated with the first scope or the second scope.

10. The non-transitory computer readable storage medium of claim 9 wherein the self-learning model is configured to take into account likely access locality and access frequency of the key-value entry across the plurality of nodes.

11. The non-transitory computer readable storage medium of claim 10 wherein the self-learning model is further configured to take in account current network latencies between the plurality of nodes or a size of the key-value entry.

12. The non-transitory computer readable storage medium of claim 7 wherein the method further comprises:
receiving a second request, subsequent to the first request, to lookup the key-value entry;
if the key-value entry is stored on the first node:
retrieving the key-value entry from a local memory or storage resource of the first node; and
if the key-value entry is not stored on the first node:
determining an owner node in the plurality of nodes where the key-value entry is stored; and
transmitting a request to the owner node for the key-value entry.

13. A node in a distributed key-value store comprising a plurality of nodes, the node comprising:
a processor; and
a non-transitory computer readable medium having stored thereon program code for implementing access pattern-based distribution of key-value content in the distributed key-value store, the program code causing the processor to:

receive a request to create a key-value entry wherein the request to create a key-value entry includes an indication of whether the key-value entry is associated with a first scope or a second scope;

determine whether the key-value entry is associated with the first scope or the second scope based on the indication included in the request of whether the key-value entry is associated with the first scope or the second scope;

if the key-value entry is associated with the first scope based on the indication included in the request of whether the key-value entry is associated with the first scope or the second scope, cause the key-value entry to be replicated on every node in the plurality of nodes; and if the key-value entry is associated with the second scope based on the indication included in the request of whether the key-value entry is associated with the first scope or the second scope, cause the key-value entry to be stored solely on the node.

14. The node of claim 13 wherein the program code for determining whether the key-value entry is associated with the first scope or the second scope comprises program code that causes the processor to:
examine a configuration data structure that includes predefined mappings between key-value entry types and scopes.

15. The node of claim 13 wherein the program code for determining whether the key-value entry is associated with the first scope or the second scope comprises program code that causes the processor to:
receive, from a self-learning model executed by the node, an indication of whether the key-value entry is associated with the first scope or the second scope.

16. The node of claim 15 wherein the self-learning model is configured to take into account likely access locality and access frequency of the key-value entry across the plurality of nodes.

17. The node of claim 16 wherein the self-learning model is further configured to take in account current network latencies between the plurality of nodes or a size of the key-value entry.

18. The node of claim 13 wherein the program code further causes the processor to:
receive a second request, subsequent to the first request, to lookup the key-value entry;
if the key-value entry is stored on the node:
retrieve the key-value entry from a local memory or storage resource of the node; and
if the key-value entry is not stored on the node:
determine an owner node in the plurality of nodes where the key-value entry is stored; and
transmit a request to the owner node for the key-value entry.

* * * * *